(12) United States Patent
Loebig et al.

(10) Patent No.: US 11,208,954 B2
(45) Date of Patent: Dec. 28, 2021

(54) MICROCHANNEL HEAT EXCHANGERS FOR GAS TURBINE INTERCOOLING AND CONDENSING

(71) Applicants: Rolls-Royce Corporation, Indianapolis, IN (US); Rolls-Royce North American Technologies, Inc., Indianapolis, IN (US)

(72) Inventors: James C. Loebig, Greenwood, IN (US); Emil R. Dejulio, Columbus, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 162 days.

(21) Appl. No.: 16/453,061

(22) Filed: Jun. 26, 2019

(65) Prior Publication Data
US 2020/0025084 A1    Jan. 23, 2020

Related U.S. Application Data

(63) Continuation of application No. 14/623,707, filed on Feb. 17, 2015, now Pat. No. 10,371,053.

(Continued)

(51) Int. Cl.
*F02C 7/18* (2006.01)
*F28D 9/00* (2006.01)
(Continued)

(52) U.S. Cl.
CPC .............. *F02C 7/18* (2013.01); *F02C 7/143* (2013.01); *F02K 3/115* (2013.01); *F28D 9/0012* (2013.01);
(Continued)

(58) Field of Classification Search
CPC .... F02C 7/18; F02C 7/143; F02C 3/04; F02K 3/115; F28D 9/0012; F28D 9/0031;
(Continued)

(56) References Cited

U.S. PATENT DOCUMENTS 2,782,009 A   2/1957  Rippingille
3,818,984 A   6/1974  Nakamura et al.
(Continued)

FOREIGN PATENT DOCUMENTS

EP    1154135 A2   11/2001
EP    2412631 A2    2/2012
(Continued)

OTHER PUBLICATIONS

European Search Report dated Jun. 26, 2015.
(Continued)

*Primary Examiner* — Nelson J Nieves
*Assistant Examiner* — Miguel A Diaz
(74) *Attorney, Agent, or Firm* — Shumaker & Sieffert, P.A.

(57) ABSTRACT

A microchannel heat exchanger (MCHX) includes an air-passage layer including a plurality of air-passage microchannels, a working fluid layer including a plurality of working fluid microchannels, and a sealing layer coupled to the working fluid layer to provide a working/sealing layer set. The working/sealing layer set includes an arrangement of raised pedestals. The raised pedestals may extend from the working fluid layer to the sealing layer and contact the sealing layer.

20 Claims, 5 Drawing Sheets

Related U.S. Application Data (60) Provisional application No. 61/943,064, filed on Feb. 21, 2014.

(51) Int. Cl.
| | | |
|---|---|---|
| *F02C 7/143* | (2006.01) | |
| *F28F 3/04* | (2006.01) | |
| *F28F 9/02* | (2006.01) | |
| *F28D 21/00* | (2006.01) | |
| *F02K 3/115* | (2006.01) | |
| *F02C 3/04* | (2006.01) | |

(52) U.S. Cl.
CPC ......... *F28D 9/0031* (2013.01); *F28D 9/0037* (2013.01); *F28F 3/048* (2013.01); *F28F 9/026* (2013.01); *F02C 3/04* (2013.01); *F05D 2210/13* (2013.01); *F05D 2220/62* (2013.01); *F05D 2220/72* (2013.01); *F05D 2230/11* (2013.01); *F05D 2260/204* (2013.01); *F05D 2260/205* (2013.01); *F05D 2260/207* (2013.01); *F28D 2021/0026* (2013.01); *F28F 2260/00* (2013.01); *F28F 2275/00* (2013.01); *F28F 2275/061* (2013.01)

(58) Field of Classification Search
CPC .............. F28D 9/0037; F28D 2021/0026; F28F 9/026; F28F 3/048; F28F 2260/00; F28F 2275/00; F28F 2275/061; F05D 2210/13; F05D 2220/62; F05D 2220/72; F05D 2230/11; F05D 2260/204; F05D 2260/205; F05D 2260/207
See application file for complete search history.

(56) References Cited

U.S. PATENT DOCUMENTS

| | | |
|---|---|---|
| 3,866,674 A | 2/1975 | Tramuta et al. |
| 4,377,025 A | 3/1983 | Masai et al. |
| 4,408,833 A | 10/1983 | Gowan |
| 4,527,622 A | 7/1985 | Weber |
| 4,729,428 A | 3/1988 | Yasutake et al. |
| 5,655,600 A * | 8/1997 | Dewar .................. F28D 9/0062 165/166 |
| 5,931,638 A | 8/1999 | Krause et al. |
| 6,988,367 B2 | 1/2006 | Thompson, Jr. et al. |
| 6,988,535 B2 | 1/2006 | Upadhya et al. |
| 7,156,159 B2 | 1/2007 | Lovette et al. |
| 7,360,309 B2 | 4/2008 | Vaidyanathan et al. |
| 7,775,031 B2 | 8/2010 | Wood |
| 8,028,410 B2 | 10/2011 | Thompson |
| 8,109,324 B2 | 2/2012 | Farid et al. |
| 8,252,245 B2 | 8/2012 | Tonkovich et al. |
| 8,357,310 B2 | 1/2013 | Steele et al. |
| 9,279,340 B2 | 3/2016 | Muthuramalingam et al. |
| 9,310,079 B2 | 4/2016 | Uskert |
| 2004/0055329 A1* | 3/2004 | Mathias .................. F25J 1/0207 62/611 |
| 2004/0055740 A1 | 3/2004 | Meshenky et al. |
| 2005/0081552 A1 | 4/2005 | Nilson et al. |
| 2006/0275185 A1* | 12/2006 | Tonkovich .............. F28F 13/06 422/130 |
| 2007/0224445 A1* | 9/2007 | Hasegawa .......... B23K 35/3033 428/660 |
| 2007/0298486 A1* | 12/2007 | Arora .................. B01J 19/0093 435/287.1 |
| 2008/0095611 A1* | 4/2008 | Storage .................... F02C 7/14 415/116 |
| 2008/0099187 A1* | 5/2008 | Rini ..................... F28D 20/023 165/104.17 |
| 2008/0264094 A1 | 10/2008 | Campagna et al. |
| 2009/0120619 A1 | 5/2009 | Sievert et al. |
| 2009/0194268 A1 | 8/2009 | Kristensen et al. |
| 2009/0211743 A1 | 8/2009 | Schrader et al. |
| 2009/0211977 A1 | 8/2009 | Miller |
| 2009/0229794 A1 | 9/2009 | Schon |
| 2009/0294113 A1 | 12/2009 | Cha et al. |
| 2009/0326279 A1 | 12/2009 | Tonkovich et al. |
| 2010/0044019 A1 | 2/2010 | Maeda et al. |
| 2010/0139900 A1 | 6/2010 | Thompson |
| 2010/0258198 A1* | 10/2010 | Tonkovich ........ B01L 3/502746 137/14 |
| 2010/0314088 A1 | 12/2010 | Yoo et al. |
| 2010/0326100 A1 | 12/2010 | Taras et al. |
| 2011/0017431 A1* | 1/2011 | Yang ..................... F28D 15/04 165/104.26 |
| 2011/0073292 A1 | 3/2011 | Datta et al. |
| 2011/0146226 A1 | 6/2011 | Wood |
| 2011/0146229 A1 | 6/2011 | Bajusz et al. |
| 2011/0168354 A1 | 7/2011 | De Jong et al. |
| 2011/0259017 A1 | 10/2011 | Lacy et al. |
| 2011/0302928 A1 | 12/2011 | Mudawar |
| 2012/0023893 A1 | 2/2012 | Yoo et al. |
| 2012/0175095 A1 | 7/2012 | Makhlouf et al. |
| 2012/0177503 A1 | 7/2012 | Lee et al. |
| 2012/0216543 A1 | 8/2012 | Eleftheriou et al. |
| 2012/0266603 A1 | 10/2012 | Uskert et al. |
| 2012/0291991 A1 | 11/2012 | Denkenberger |
| 2012/0325436 A1 | 12/2012 | Shedd |
| 2013/0094944 A1 | 4/2013 | Lacy et al. |
| 2013/0152392 A1 | 6/2013 | Swinford |
| 2014/0079978 A1 | 3/2014 | Al-Hallaj et al. |
| 2014/0116664 A1* | 5/2014 | Landre ................. F28D 9/0062 165/166 |
| 2014/0196870 A1* | 7/2014 | Rusich ................... F28F 3/005 165/104.14 |
| 2014/0212628 A1 | 7/2014 | Lin et al. |
| 2014/0246183 A1 | 9/2014 | Loebig et al. |
| 2015/0047367 A1 | 2/2015 | Benignos |
| 2015/0107801 A1 | 4/2015 | Campbell et al. |
| 2015/0122465 A1 | 5/2015 | Mori et al. |
| 2015/0152737 A1 | 6/2015 | Liang |
| 2015/0184539 A1 | 7/2015 | Maier et al. |
| 2015/0198380 A1 | 7/2015 | Haj-Hariri et al. |
| 2015/0204197 A1 | 7/2015 | Lee et al. |
| 2015/0218962 A1 | 8/2015 | Weber et al. |
| 2015/0240722 A1 | 8/2015 | Loebig et al. |
| 2016/0084167 A1 | 3/2016 | Birnkrant et al. |
| 2016/0108740 A1 | 4/2016 | Srinivasan et al. |
| 2016/0123230 A1 | 5/2016 | Thomas |
| 2016/0169016 A1 | 6/2016 | Blaney et al. |
| 2016/0177751 A1 | 6/2016 | Otomo et al. |
| 2016/0201914 A1 | 7/2016 | Drake |
| 2016/0208704 A1 | 7/2016 | Bouldin et al. |
| 2016/0215628 A1 | 7/2016 | Spangler et al. |
| 2017/0067700 A1 | 3/2017 | Sugama et al. |
| 2017/0114722 A1 | 4/2017 | Turcotte et al. |
| 2017/0131035 A1 | 5/2017 | Honnorat et al. |
| 2017/0250655 A1 | 8/2017 | Cope et al. |
| 2017/0314471 A1 | 11/2017 | Sennoun |
| 2018/0172368 A1 | 6/2018 | Kowalski et al. |

FOREIGN PATENT DOCUMENTS

| | | | |
|---|---|---|---|
| EP | 2910887 A1 | 8/2015 | |
| JP | 2004028538 A | 1/2004 | |
| WO | WO-9703281 A1 * | 1/1997 | .............. F28F 3/005 |
| WO | 2003/080233 A1 | 10/2003 | |

OTHER PUBLICATIONS

English Abstract of JP 2004025838A.
Extended European Search Report dated Oct. 29, 2019 related to corresponding European Patent Application No. 19178904.9.

* cited by examiner

FIG. 7B

MICROCHANNEL HEAT EXCHANGERS FOR GAS TURBINE INTERCOOLING AND CONDENSING

CROSS-REFERENCE TO RELATED APPLICATIONS

This application is a continuation application of U.S. Ser. No. 14/623,707, filed on Feb. 17, 2015, now issued as U.S. Pat. No. 10,371,053, which claims priority to U.S. Provisional Patent Application No. 61/943,064, filed Feb. 21, 2014, the contents of both of which are hereby incorporated in their entirety.

GOVERNMENT RIGHTS

This disclosure was made with government support under FA8650-09-D-2921 0009 awarded by the United States Air Force. The government has certain rights in the disclosure.

FIELD OF TECHNOLOGY

An improved heat exchanger for use in a gas turbine engine is disclosed.

BACKGROUND

Heat exchangers may be employed in the gas turbine engine sector (e.g., the aerospace sector) for the purpose of transferring heat between a core air stream and a bypass stream. Historically, air to air type heat exchangers are employed for this purpose. These types of heat exchangers however can require complex ducting, which adds system weight, costs, and can reduce their effectiveness. Accordingly, there is room for further improvements in this area.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Figure 1:
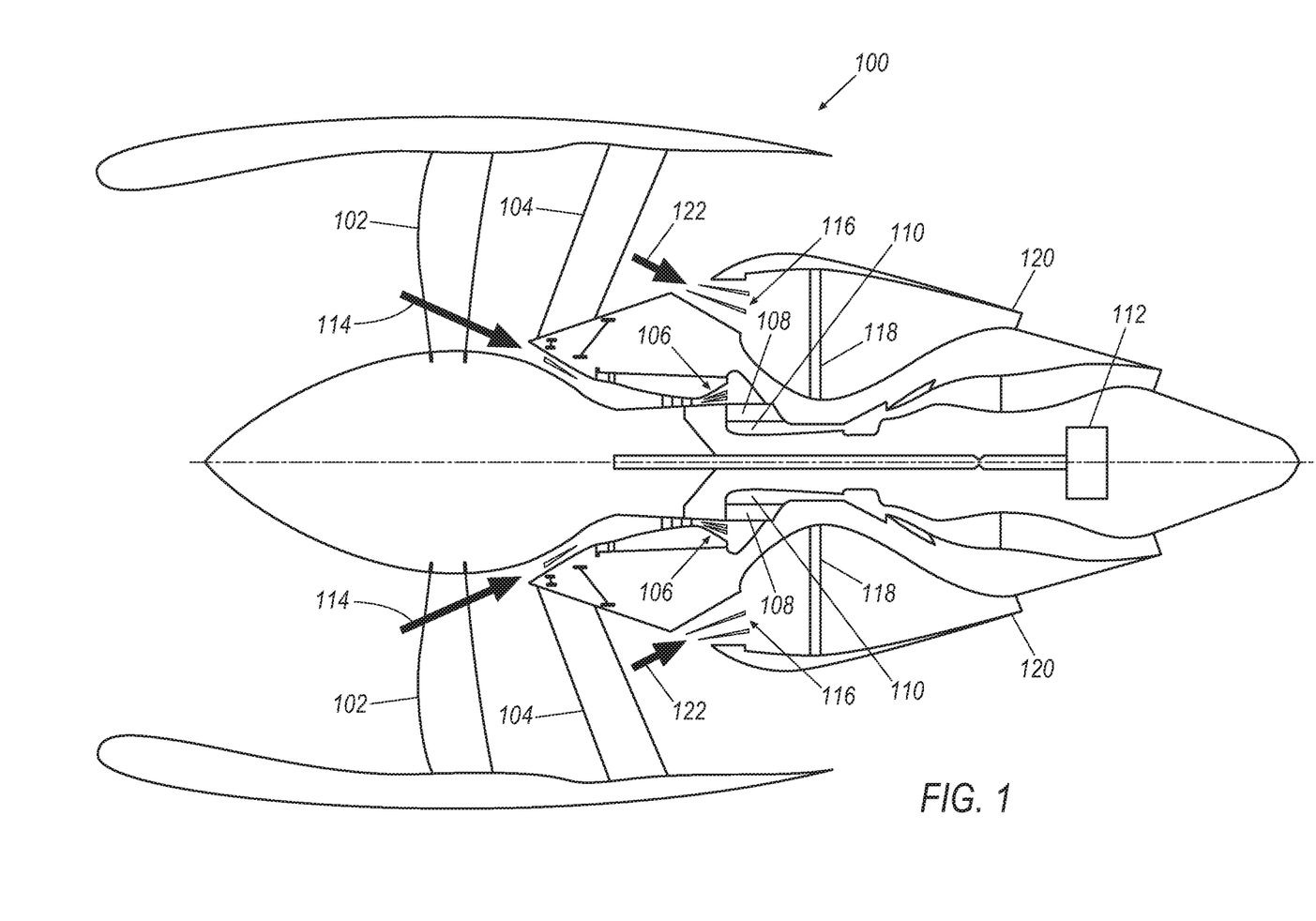
FIG. 1 illustrates an exemplary gas turbine.

FIG. 1 illustrates an exemplary gas turbine engine 100, which includes a fan 102, a vane/strut 104, a core stream diffuser 106, an intercooler-type microchannel heat exchanger (MCHX) 108, a high pressure compressor nozzle 110, and a closed cycle turbine 112. Ambient air enters past the fan 102 and is directed past the core stream diffuser 106 as a core air stream 114 that proceeds through the intercooler-type MCHX 108 where it is cooled.

The gas turbine engine 100 also includes a bypass stream diffuser 116, a condenser-type MCHX 118, and an exit nozzle 120. Fan stream air in the form of a bypass air stream 122 proceeds past the bypass stream diffuser 116 to the condenser-type MCHX 118, and passes through the condenser-type MCHX 118 where the bypass air stream 122 is heated before exiting the exit nozzle 120. As will be discussed in detail below with respect to FIG. 2, according to an embodiment, a working fluid (not shown) that passes through the intercooler-type MCHX 108 of FIG. 1 also passes through the condenser-type MCHX 118. Accordingly, the core air stream 114 heats the working fluid in the intercooler-type MCHX 108 (i.e., heat is transferred from the core air stream 114 to the working fluid in the intercooler-type MCHX 108) while the bypass air stream 122 cools the working fluid in the condenser-type MCHX 118 (i.e., heat is transferred from the working fluid in the condenser-type MCHX 118 to the bypass air stream 122).

Further details regarding the intercooler-type MCHX 108 and the condenser-type MCHX 118 will be set forth below with respect to FIGS. 2-7.

Figure 2:
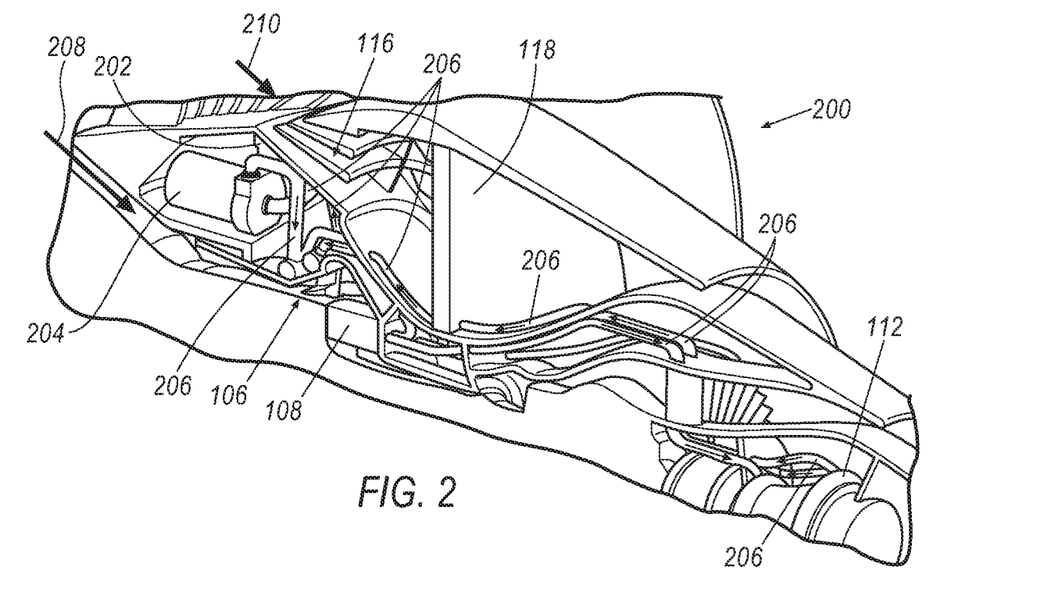
FIG. 2 illustrates a exemplary microchannel heat exchange system according to an embodiment.

With reference now to FIG. 2, a detailed view 200 of a portion of gas turbine engine 100 of FIG. 1 employing a microchannel heat exchange system is shown according to an embodiment. The portions of the gas turbine engine 100 shown in both FIGS. 1 and 2 include the intercooler-type MCHX 108, the closed cycle turbine 112, the condenser-type MCHX 118, the core stream diffuser 106, and the bypass stream diffuser 116. FIG. 2 also depicts an accumulator/separator 202, a liquid working fluid pump 204, and a series of working fluid piping 206.

According to an embodiment, a core air stream 208 passes through the core stream diffuser 106 and through the intercooler-type MCHX 108. As the core air stream 208 passes though the intercooler-type MCHX 108, a working fluid (not shown) therein changes phase from a liquid to a gas as heat from the core air stream 208 is transferred to the working fluid in the intercooler-type MCHX 108. Alternatively, it is contemplated that the working fluid instead changes from a liquid to a supercritical fluid. Referring back to the present embodiment, after passing through the intercooler-type MCHX 108 the working fluid then passes via the series of working fluid piping 206 as a high pressure gas or supercritical fluid to the closed cycle turbine 112 thus generating power. The working fluid is then conveyed via the series of working fluid piping 206 as a low pressure gas or gas and liquid mixture to the condenser-type MCHX 118. The condenser-type MCHX 118 causes the working fluid therein to change phase once again, this time from a gas to a liquid by transferring heat from the working fluid to a bypass air stream 210 that passes through the condenser-type MCHX 118 via the bypass stream diffuser 116.

Accordingly, heat has been transferred from the core air stream 208 to the bypass air stream 210 via the working fluid.

After the working fluid passes through the condenser-type MCHX 118, the working fluid is then conveyed via the series of working fluid piping 206 as a liquid to the accumulator/separator 202, then to the liquid pump 204, and then again to the intercooler-type MCHX 108. As will be appreciated, piping configurations different than the configuration of the series of working fluid piping 206 shown in FIG. 2 may be employed to couple together two MCHXs such as intercooler-type MCHX 108 and condenser-type MCHX 118.

By employing a heat exchange or management system having the intercooler-type MCHX 108 functionally or fluidly connected to the condenser-type MCHX 118 as shown in FIG. 2, heavy and complex ducting previously required with air-to-air heat exchange systems can be avoided or at least minimized.

Figure 3A:
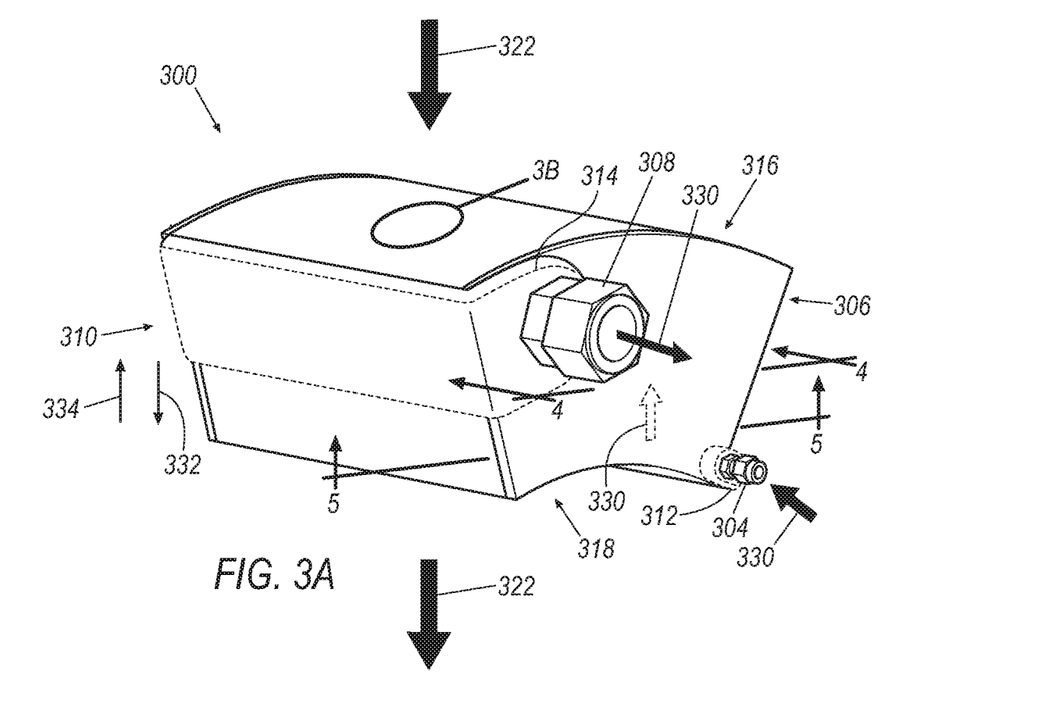
FIG. 3A illustrates an exemplary microchannel heat exchanger (MCHX) according to an embodiment.
Figure 3B:
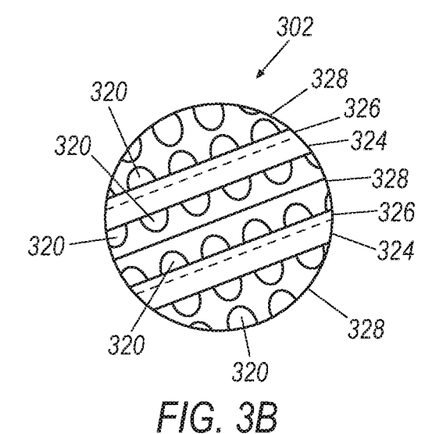
FIG. 3B illustrates an exaggerated view of a region of the exemplary MCHX of FIG. 3A according to an embodiment.

Turning now to FIGS. 3A-3B, an MCHX 300 and an exaggerated view 302 of a portion thereof are shown according to an embodiment. The MCHX 300 includes an inlet 304 on a front side 306 and an outlet 308 also on the front side 306. It is noted, that according to other embodiments, the outlet may be on a back side 310 rather than the front side 306. Alternatively, the outlet 308 may remain on the front side 306, while the inlet 304 is instead positioned on the back side 310. Indeed, according to embodiments, the outlet 308 and inlet 304 may be on any side of the MCHX 300.

Referring to the present embodiment, though not required, it is contemplated that the MCHX 300 have an external intake manifold 312 and an external outtake manifold 314, where each is shown in phantom. The MCHX 300 also includes a top side 316 and a bottom side 318.

The exaggerated view 302 of FIG. 3B is of region A on the top side 316 of the MCHX 300 shown in FIG. 3A. As illustrated in the exaggerated view 302, the top side 316 includes a plurality of air-passage channels 320. These air-passage channels 320 extend through the MCHX 300 from the top side 316 to the bottom side 318. The air-passage channels 320 are configured to allow air 322 to pass through the MCHX 300. That is, the air-passage channels 320 are configured to allow air 322 to enter the top side 316 of the MCHX 300 and exit through the bottom side 318 of the MCHX 300. Further information regarding the plurality of air-passage channels 320 will be set forth in detail below with respect to FIGS. 4 and 7A-7B.

The exaggerated view 302 of FIG. 3B also illustrates that the MCHX 300 is comprised of a plurality of layers. The layers include a plurality of working fluid layers 324, a plurality of sealing layers 326, and a plurality of air-passage layers 328 that includes the plurality of air-passage channels 320. Each layer 324-328 extends from the top side 316 of the MCHX 300 to the bottom side 318 of the MCHX 300. It is contemplated that these layers 324-328 include nickel, titanium, and/or aluminum alloys.

According to an embodiment, a working fluid 330 enters the MCHX 300 via the inlet 304 into the external intake manifold 312, passes through the working fluid layers 324 that run parallel with the air-passage channels 320 of the air-passage layers 328, through the external outtake manifold 314, and then out the outlet 308. The working fluid 330 may be almost any fluid or mixture, including high pressure gases, single component 2-phase fluids, multi-component mixtures 2-phase fluids, single component and multi-component supercritical fluids, and single and multi-component liquids.

The MCHX 300 is generally a counter flow-type heat exchanger. That is, as air 322, such as a core stream or a bypass stream, moves through the MCHX 300 via the air-passage channels 320 in a first direction 332, heat is transferred between the air 322 and the working fluid 330 that is moving in a second direction 334 that is opposite the first direction 332. Accordingly, an efficient heat transfer occurs between the air 322 in the air-passage channels 320 and the working fluid 330 moving in an opposite direction in the working fluid layer 324.

If the MCHX 300 functions as an intercooler, the air 322 entering the top side 316 of the MCHX 300 is warmer than the working fluid 330 entering the inlet 304. As such, heat is transferred from the air 322 to the working fluid 330 as each travel in opposite directions through the MCHX 300.

The MCHX 300, if configured to act as an intercooler, is configured to allow the working fluid 330 to take on a gaseous form as it passes through the working fluid layer 324 and absorbs heat from the air 322 passing in the opposite direction through the air-passage layers 328. Accordingly, the working fluid 330 entering the inlet 304 is in a high pressure liquid form and the working fluid leaving the MCHX 300 via the outlet 308 is in a gaseous form (e.g., steam form). It is noted that whether the working fluid 330 is in a fluid or gaseous form, it is still considered a working fluid.

Alternatively, the MCHX 300 may be configured to serve as a condenser-type MCHX. According to such an embodiment, the working fluid 330 passes heat to the air 322 and the working fluid 330 condenses as it passes through the working fluid layer 324.

It is noted that the saddle shape of the MCHX 300 depicted in FIG. 3 may be beneficial in a variety of applications. For example, MCHX 300 may be an intercooler-type heat exchanger that may be fit between an intermediate pressure compressor and a high pressure compressor in a three spool high bypass turban engine. It is noted, however, that embodiments are not dictated by the shape of the MCHX 300 shown in FIG. 3. That is, alternate embodiments may employ other shapes that also employ microchannel air-passage and working fluid layers. Further, embodiments may also be implemented in applications other than three spool applications, such as single or double spool (shaft) applications.

Figure 4:
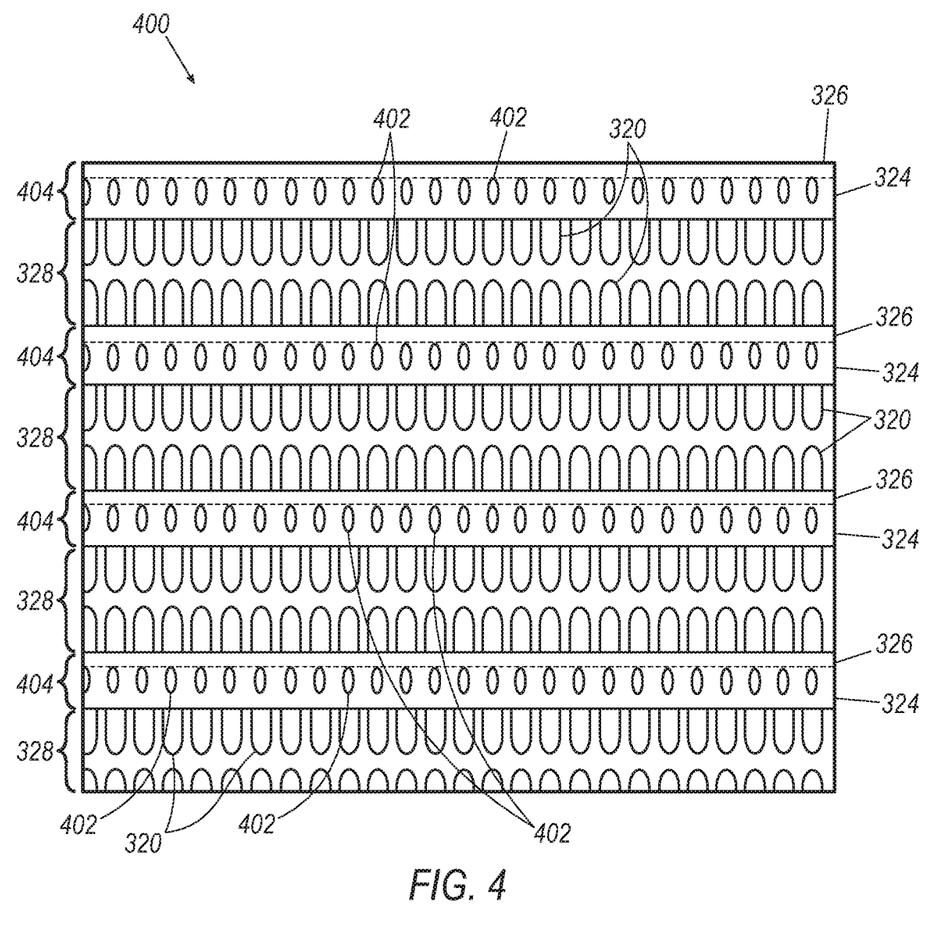
FIG. 4 illustrates a partial cross-sectional view of FIG. 3*a* along 4-4 according to an embodiment.

Referring now to FIG. 4, a partial cross-sectional view 400 of the MCHX 300 of FIG. 2 along 4-4 is shown according to an embodiment. That is only a portion of the cross-section along 4-4 is shown. As seen in FIG. 4, the plurality of the working fluid layers 324, the plurality of the sealing layers 326, and the plurality of the air-passage layers 328, each depicted in FIG. 3, are also depicted in FIG. 4. Each of the working fluid layers 324 includes a plurality of working fluid channels 402 and each of the air-passage layers 328 includes the plurality of the air-passage channels 320. As air (not shown) passes through the air-passage channels 320, heat is transferred between the air and the working fluid (not shown) that is passing in the opposite direction through the working fluid channels 402. The working fluid channels 402 and air-passage channels 320 are microchannels and the sizes generally range from 0.005 inches to 0.120 inches.

It is contemplated that during manufacturing, the layers 324-328 be bonded together by diffusion bonding or brazing. Accordingly, boundaries between the layers would be generally indistinguishable.

Further, it is contemplated that during manufacturing, a plurality of working/sealing sets 404 are created via diffusion bonding or brazing. That is, each of the working fluid layers 324 is respectively diffusion bonded or brazed to each of sealing layers 326 to form the plurality of working/sealing sets 404. According to an embodiment, the sealing layers 402 are un-etched, and each effectively creates a seal over the working fluid layer 324 while leaving the working fluid channels 402 of the sets 404 open for fluid flow.

These working/sealing sets 404 have a high structural integrity since they, in some aspects, act as a pressure vessel for the high pressure working fluid that flows therethrough. Since the working fluid channels 402 are microchannels, each of the working/sealing sets 404 accommodate a high pressure of working fluid without a corresponding high stress in each of the working/sealing sets 404 due to the low value of Pr/t stress, where "P" is internal pressure, "r" is channel diameter, and "t" is channel wall thickness.

After the sets 404 are created, each is respectively diffusion bonded or brazed to each of the air-passage layers 328. In other words, each of the air-passage layers 328 is sandwiched between two of the working/sealing sets 404.

According to an embodiment where the MCHX, such as MCHX 300, is configured as an intercooler in a turbofan environment, eight of the MCHXs 300 may be employed, each having one hundred and thirty-two air-passage layers 328 with each air-passage channel 320 thereof having a dimension of 0.0225 inches by 0.0225 inches. Each of the eight MCHX 300 would also employ one hundred and thirty-three working/sealing sets 404 with the sets 404 being approximately 0.020 inches thick. In such an embodiment, each of the working/sealing sets 404 may have an approximately 0.005 inch thick un-etched sealing layer 326 and an approximately 0.015 inch thick working fluid layer 324. The etch depth of the working fluid channels 402 may be approximately 0.010 inches. It is noted that according to other embodiments, other dimensions may instead be employed that fall within the microchannel range set forth above.

Figure 5:
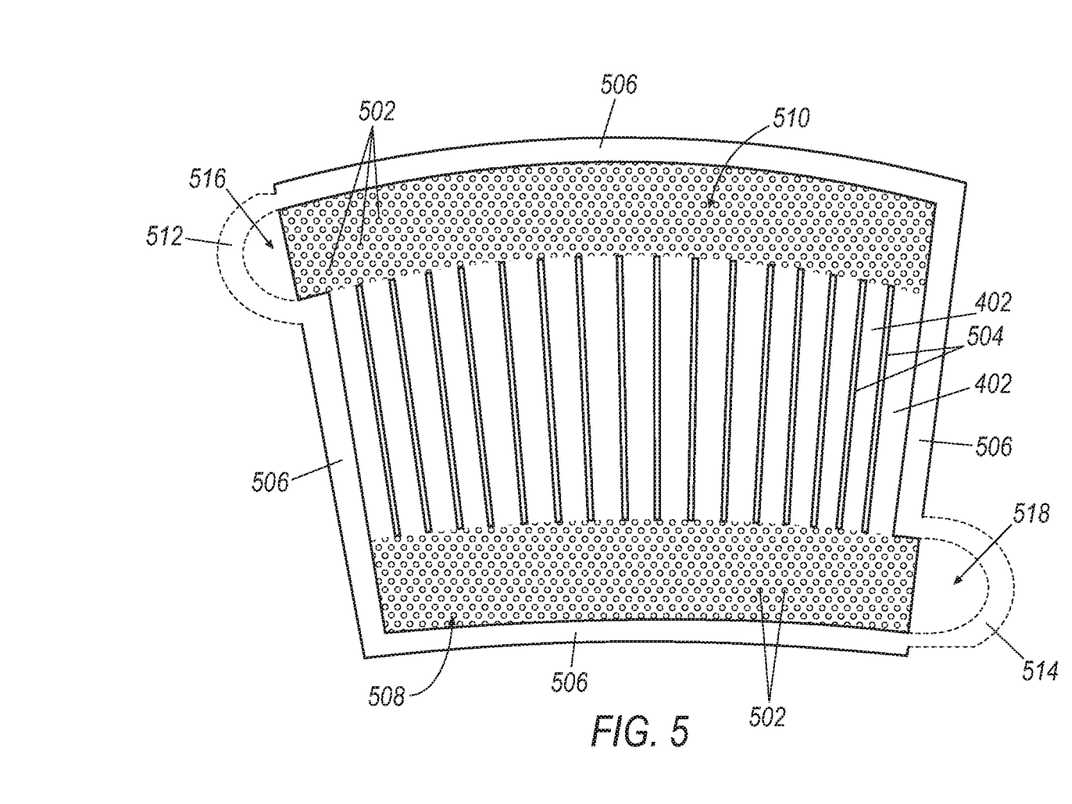
FIG. 5 illustrates a cross-sectional view of FIG. 3*a* along 5-5 according to an embodiment.

With reference now to FIG. 5, a cross-sectional view of the MCHX 300 of FIG. 3a along 5-5 is shown according to an embodiment. The cross-sectional view shown in FIG. 5 depicts a single working fluid layer 500, such as one of the working fluid layers 324 of FIGS. 3A-4. The single working fluid layer 500 of FIG. 5 includes the plurality of working fluid channels 402, a plurality of raised pedestals 502, a plurality of substrate rises 504, a substrate perimeter 506, and an internal intake and outtake manifolds 508, 510, respectively, around the raised pedestals 502. The internal intake and outtake manifold 508, 510 are generally the same depth as the working fluid channels 402. An upper and lower portion 512, 514 (respectively shown in phantom) of the respective external outtake and intake manifolds 314, 312 of FIG. 3A are also shown. With continued reference to FIG. 5, it is noted that the substrate rises 504, substrate perimeter 506, and the upper and lower portions 512, 514, respectively, are generally at the same height.

FIG. 5 also depicts an external outtake manifold void 516 and an external intake manifold void 518. It is noted that according to an embodiment, external intake and outtake manifolds are not required since the internal intake manifold 508 and the internal outtake manifold 510 may be all that is needed to accommodate the transfer of the working fluid.

According to the present embodiment, the single working fluid layer 500 is configured to allow a working fluid to enter from the external intake manifold void 518 into the internal intake manifold 508 around the pedestals 502 therein and pass into the plurality of working fluid channels 402. It is contemplated that the working fluid be a mixture such as a water-ammonia mixture. The working fluid passes through the working fluid channels 402 and enters the internal outtake manifold 510 where it passes around the raised pedestals 502 therein and out the external outtake manifold void 516. It is noted that, according to the embodiment depicted in FIG. 5, the single working fluid layer 500 is for an evaporative or boiling type MCHX such as intercooler-type MCHX 108 depicted in FIGS. 1 and 2. Accordingly, the volume of the internal outtake manifold 510 of FIG. 5 is larger than the volume of the internal intake manifold 508. The larger volume of the internal outtake manifold 510 accommodates the expansion of the working fluid from a liquid to a gas or supercritical fluid as it passes through the working fluid channels 402. However, in an alternate embodiment not shown where the MCHX is a condenser-type MCHX, the internal outtake manifold has a smaller volume than the internal intake manifold to accommodate the decrease in volume (e.g., condensing from a gas to a liquid) of the working fluid as it passes through the working fluid channels thereof.

With continued reference to FIG. 5, the arrangement of the raised pedestals 502 shown is configured to aid the flow of the working fluid. For example, the arrangement of the raised pedestals 502 in the internal intake manifold 508 aides in the distribution of the working fluid into the working fluid channels 402. Likewise, the arrangement of the pedestals 502 in the upper working fluid region 510 aides in the transfer of the working fluid out of the working fluid channels 402 and into the external outtake manifold void 516.

The size of the working fluid channels 402 generally ranges from 0.005 inches to 0.120 inches. The single working fluid layer 500 is manufactured by a process that combines portions of printed circuit board manufacturing (e.g., masking, ultraviolet exposure, and mask development) with electrochemical machining/etching in sheet metal. With regards to the etching, isotropic or anisotropic etching may be employed.

Due to the manner of manufacturing of the single working fluid layer 500, the design of the single working fluid layer 500 is easily configurable. For example, whereas the embodiment of FIG. 5 depicts straight working fluid channels 402 and round raised pedestals 502, other embodiments may employ different shapes of these features. For example, though not shown, the design artwork may be relatively easily modified to employ pedestals that are not round and/or channels that are staggered or even snake shaped. It is the use of the resist, mask, expose, develop, and electrochemical etching/machining processes employed in the printed circuit board sector that make the design art work easily configurable.

It is noted that embodiments are not dictated by the saddle shape shown in FIG. 5. That is, working fluid layers may take on shapes other than a saddle shape.

Figure 6:
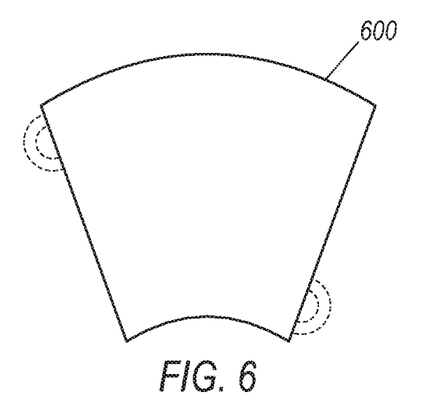
FIG. 6 illustrates an exemplary MCHX sealing layer according to an embodiment.

Referring now to FIG. 6, a sealing layer 600 is shown according to an embodiment. As discussed above with respect to FIG. 4, it is contemplated that each working fluid layer (e.g., single working fluid layer 500 of FIG. 5) is bonded to a sealing layer (e.g., the sealing layer 326 of FIG. 4), thus creating a working sealing set such as working/sealing set 404 of FIG. 4. Accordingly, the sealing layer 600 of FIG. 6 is configured to have generally the same footprint as the working fluid layer (e.g., the working fluid layer 500 of FIG. 5). The sealing layer 600 is bonded via diffusion bonding or brazing to the raised substrate of the working fluid layer. For example, with reference to FIGS. 5 and 6, the sealing layer 600 is bonded to the substrate rises 504, the substrate perimeter 506, the raised pedestals 502, and the upper and lower portions of the respective external outtake and intake manifolds 512, 514 of the single working fluid layer 500. Since neither the working fluid channels 402 nor the internal outtake and intake manifolds 510, 508, respectively, around the raised pedestals 502 are bonded to the sealing layer 600, the working fluid is allowed to move into the internal intake manifold 508 via the external intake manifold void 518, then into the working fluid channels 402, out into the internal outtake manifold 510, and then out through the external outtake manifold void 516.

It is noted that embodiments are not dictated by the saddle shape shown in FIG. 6. That is, sealing layers may take on shapes other than a saddle shape.

Figure 7A:
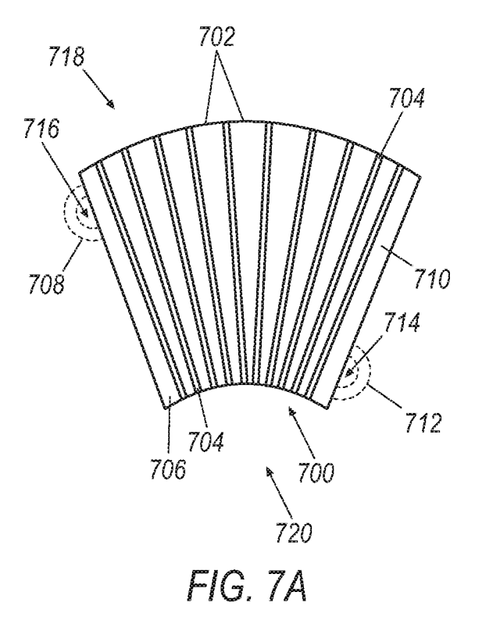
FIG. 7A illustrates an exemplary MCHX air-passage layer according to an embodiment.

With reference now to FIG. 7A, an air-passage layer 700 is shown according to an embodiment. The air-passage layer 700 includes a plurality of air-passage channels 702, a plurality of air-passage substrate rises 704, a first substrate perimeter 706, a portion of external outtake manifold region 708 (shown in phantom), a second substrate perimeter 710, and a portion of an external intake manifold region 712 (shown in phantom). Further, FIG. 7A also depicts a portion of an external intake manifold void 714 and an external outtake manifold void 716.

It is noted that the air-passage channels 702 and the air-passage substrate rises 704 extend from a top end 718 of the air-passage layer 700 to a bottom end 720 of the air-passage layer 700. Further, according to the present embodiment, the air-passage channels 702 generally converge at the bottom end 720 relative to the top end 718. As such, if the air-passage layer 700 is employed in an intercooler-type MCHX (e.g., intercooler-type MCHX 108 of FIGS. 1 and 2), the convergence compensates for any loss of air stream velocity through the air-passage channels 702 of FIG. 7A due to cooling. Other embodiments, however, are envisioned having convergence instead on the top end 718 or no convergence at all.

The air-passage substrate rises 704, first and second perimeters 706, 710, and the portions of the external outtake and intake manifolds 708, 712 are generally at the same height. Accordingly, these areas 704-712 are diffusion bonded or brazed to respective working/sealing sets 404 of FIG. 4 during manufacture.

The air-passage channels 702 of FIG. 7A are microchannels and generally range in size between 0.005 inches and 0.120 inches. The small features of the of the air-passage channels 702 enable a large air surface area of the air-passage layer 700 so that the product of the heat transfer coefficient times the surface area (i.e., the HA product) can be generally the same magnitude as the working fluid layer (e.g., working/sealing sets 404). Accordingly, an MCHX (e.g., intercooler-type MCHX 108 and condenser-type MCHX 118, each of FIGS. 1 and 2, and MCHX 300 of FIG. 3) can be a fraction of the volume of a conventional heat exchanger (not shown) with generally equivalent performance (e.g., air pressure loss and thermal efficiency).

The air-passage layer 700 is manufactured by a process that combines portions of printed circuit board manufacturing (e.g., masking, ultraviolet exposure, and mask development) with electrochemical machining/etching in sheet metal. With regards to the etching, isotropic or anisotropic etching may be employed.

Due to the manner of manufacturing the air-passage layer 700, the design of thereof is configurable. For example, whereas the embodiment of FIG. 7A depicts straight air-passage channels 702, other embodiment may employ different shapes of this feature. For example, though not shown, the design artwork may be relatively easily modified to create staggered or snake shaped air-passage microchannels. Further, it is noted that embodiments are not dictated by the saddle shape shown in FIG. 7A. That is, air-passage layers may take shapes other than a saddle shape.

Figure 7B:
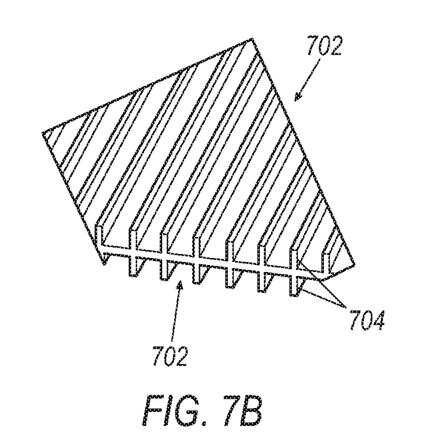
FIG. 7B illustrates a perspective view of a portion of the exemplary MCHX air-passage layer of FIG. 7A according to an embodiment.

Referring now to FIG. 7B, where FIG. 7B depicts a perspective view of a portion of air-passage layer 700 of FIG. 7A according to an embodiment. FIG. 7B illustrates that it is contemplated that the air-passage channels 702 and the air-passage substrate rises 704 are on both sides of air-passage layer 700.

According to embodiments, MCHXs such as MCHX 108 and 118, both of FIGS. 1 and 2, and MCHX 300 of FIG. 3 are comprised of a plurality of microchannel layers (e.g., working fluid layer 324 shown in FIGS. 4 and 5 and air-passage layer 700 shown in FIG. 7). Such MCHXs have a high level or porosity, where porosity is a total void volume (i.e., the sum of each manifold volume and each passage or channel volume) over the total MCHX volume. Whereas a typical heat exchanger (not shown) may have a porosity in the range from twenty to thirty percent, embodiments of the MCHX discussed in detail herein may have a porosity in the range of thirty to seventy percent.

The MCHXs (i.e., 108 and 118 both of FIGS. 1 and 2, and 300 of FIG. 3) and the embodiments thereof discussed in detail above, whether they are of the intercooler or condenser-type MCHXs, have the advantages of having a small size and weight for a given thermal effectiveness and pressure drop. As discussed above, they have a high porosity. Accordingly, these types of MCHXs can be utilized in applications that have tight size and weight requirements. For example, the MCHXs discussed above and the embodiments thereof can be utilized in aerospace application where size and weight requirements need to be met. Further, since an intermediate fluid is utilized (e.g., working fluid 330 of FIG. 3a), the need for heavy and complex ducting often needed for air-to-air type heat exchangers can be avoided.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:
1. A microchannel heat exchanger, comprising:
an air-passage layer including a plurality of air-passage microchannels structured and arranged to convey an air stream in a first direction;
a working fluid layer including a plurality of working fluid microchannels structured and arranged to convey a working fluid in a second direction opposite to the first direction, an internal intake manifold disposed at an inlet of the plurality of working fluid microchannels, and an internal outtake manifold disposed at an outlet of the plurality of working fluid microchannels;
a sealing layer coupled to the working fluid layer to provide a working/sealing layer set;
wherein the working/sealing layer set includes an arrangement of raised pedestals disposed in the internal intake manifold and the internal outtake manifold, and wherein the arrangement of raised pedestals comprises raised pedestals that extend from the working fluid layer to the sealing layer and contact the sealing layer; and wherein the plurality of air-passage microchannels extend from a first distal end of the air-passage layer to a second distal end of the air-passage layer along a longitudinal plane of the air-passage layer.

2. The microchannel heat exchanger of claim 1, wherein the plurality of air-passage microchannels are disposed on a first side of the air-passage layer and on a second side of each air-passage layer of the plurality of air-passage layers, and wherein the first side is opposite the second side.

3. The microchannel heat exchanger of claim 1, wherein the plurality of air-passage microchannels converge at the second distal end relative to the first distal end of the air-passage layer.

4. The microchannel heat exchanger of claim 1, wherein the working fluid layer further includes a raised substrate perimeter, the raised substrate perimeter defining a lateral intake void disposed at the internal intake manifold and a lateral outtake void disposed at the internal outtake manifold to provide a cross-flow between the working fluid and the air stream in a region of the internal intake manifold and the internal outtake manifold.

5. The microchannel heat exchanger of claim 1, wherein at least one of:
the raised pedestals have a circular shape in cross-section; and
the first distal end is a top end of the air-passage layer and the second distal end is a bottom end of the air-passage layer that is arranged downstream of the top end relative to the air stream.

6. The microchannel heat exchanger of claim 1, wherein the air-passage layer, the working fluid layer, and the sealing layer are respectively composed of a material including at least one of nickel, titanium, and aluminum alloys.

7. The microchannel heat exchanger of claim 1, wherein the working fluid layer further includes a plurality of substrate rises structured and arranged to guide the working fluid through the plurality of working fluid microchannels, the plurality of substrate rises having a longitudinal extent arranged axially to the second direction and extend between the internal intake manifold and the internal outtake manifold.

8. The microchannel heat exchanger of claim 7, wherein the sealing layer is diffusion bonded or brazed to the plurality of substrate rises and the raised pedestals of the working fluid layer.

9. A gas turbine engine, comprising: a microchannel heat exchanger, the microchannel heat exchanger including:
a plurality of air-passage layers respectively including a plurality of air-passage microchannels structured and arranged to pass an air stream therethrough, the plurality of air-passage microchannels converging at a second distal end of a respective air-passage layer relative to a first distal end of the respective air-passage layer along a longitudinal plane of the respective air-passage layer;
a plurality of working fluid layers respectively including a plurality of working fluid microchannels structured and arranged to pass a working fluid therethrough, an internal intake manifold disposed at an inlet of the plurality of working fluid microchannels, and an internal outtake manifold disposed at an outlet of the plurality of working fluid microchannels;
a plurality of sealing layers coupled to the plurality of working fluid layers such that a single sealing layer of the plurality of sealing layers is coupled to a single working fluid layer of the plurality of working fluid layers to provide a plurality of working/sealing layer sets; and
wherein the plurality of working fluid layers respectively further include an arrangement of raised pedestals disposed in the internal intake manifold and the internal outtake manifold, and wherein the arrangement of raised pedestals comprises raised pedestals that extend transversely to a through-flow direction of the plurality of working fluid microchannels from the single working fluid layer to the single sealing layer and contacts the single sealing layer of the plurality of working/sealing layer sets.

10. The gas turbine engine of claim 9, wherein the internal intake manifold of at least one working fluid layer has a dimensional volume different than the internal outtake manifold of the at least one working fluid layer.

11. The gas turbine engine of claim 9, wherein the microchannel heat exchanger has a porosity of between 0.30 and 0.70, and wherein the porosity is a sum of each void volume in the microchannel heat exchanger divided by a total volume of the microchannel heat exchanger.

12. The gas turbine engine of claim 9, wherein the microchannel heat exchanger is an intercooler or a condenser.

13. The gas turbine engine of claim 9, wherein the raised pedestals are diffusion bonded to a side of the single sealing layer facing towards the internal intake manifold and the internal outtake manifold of the single working fluid layer of the plurality of working/sealing layer sets.

14. A method of manufacturing a microchannel heat exchanger, comprising:
providing an air-passage layer by machining an air-passage substrate to include a plurality of air-passage microchannels that extend from a first distal end of the air-passage layer to a second distal end of the air-passage layer along a longitudinal plane of the air-passage layer; and
providing a working fluid layer by machining a working fluid substrate to include a plurality of working fluid microchannels, an internal intake manifold disposed at an inlet of the plurality of working fluid microchannels, an internal outtake manifold disposed at an outlet of the plurality of working fluid microchannels, and a plurality of raised pedestals disposed in the internal intake manifold and the internal outtake manifold;
forming a working/sealing layer set by bonding a sealing layer to the working fluid layer such that the sealing layer seals over the working fluid layer;
wherein the sealing layer is bonded to the working fluid layer via the plurality of raised pedestals disposed in the internal intake manifold and the internal outtake manifold, where the plurality of raised pedestals extend from the working fluid substrate to the sealing layer.

15. The gas turbine engine of claim 9, wherein each air-passage layer of the plurality of air-passage layers is diffusion bonded between two working/sealing layer sets of the plurality of working/sealing layer sets.

16. The gas turbine engine of claim 15, wherein the microchannel heat exchanger has a saddle shape.

17. The method of claim 14, wherein machining the air-passage substrate includes forming the plurality of air-passage microchannels to converge at the second distal end relative to the first distal end.

18. The method of claim 14, wherein at least one of machining the air-passage substrate and machining the working fluid substrate includes electrochemical etching a piece of sheet metal.

19. The method of claim 14, wherein the plurality of raised pedestals are diffusion bonded to a side of the sealing layer facing towards the internal intake manifold and the internal outtake manifold and contact the side of the sealing layer via a bonded connection.

20. The gas turbine engine of claim 9, wherein the plurality of air-passage microchannels extend from the first distal end to the second distal end along the longitudinal plane of the respective air-passage layer.

* * * * *